United States Patent Office 3,137,709
Patented June 16, 1964

3,137,709
3-ALLYLOXY-16-OXIMINO-17-KETO STEROIDS
Max N. Huffman, P.O. Box 1982, Colorado Springs, Colo.
No Drawing. Filed Apr. 18, 1962, Ser. No. 188,524
5 Claims. (Cl. 260—397.4)

This invention relates to oximino steroids and the production thereof. In particular, it relates to 3-allyloxy-16-oximino-17-keto steroids of the following general formula:

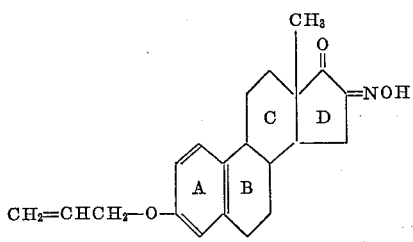

wherein ring B can contain 1 to 3 double bonds.

The 16-oximino radical exists in a tautomeric 16-nitroso form, as illustrated by the general equation

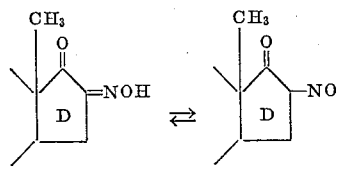

and it will be understood that this specification and claims cover both forms even though only one form is illustrated by formula.

The oximino steroids which comprise this invention have useful physiological properties. They are active by oral administration in suppressing growth of the prostate glands of mammals. They are particularly efficacious by the oral route in contrast to many steroids. For instance, upon oral administration to intact male rats they exhibit strong antiprostatic action but no estrogenic hormone activity.

It is an object of this invention to provide 3-allyloxy-16-oximino-17-keto steroids of useful physiological properties. It is a further object to provide 3-allyloxy-16-oximino-17-keto steroids having an aromatic ring A and 1 to 3 double bonds in ring B. It is another object to provide such steroids having antiprostatic activity on oral administration. These and other objects are apparent from and are achieved in accordance with the following disclosure.

The oximino steroids which comprise this invention are produced from steroid 3-allyl ethers of the general formula

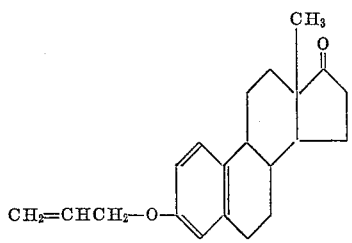

wherein ring B can contain 1 to 3 double bonds, inclusive, by reaction with an alkyl nitrite and an alkali metal salt of a tertiary alcohol, according to the procedure disclosed in the Huffman Patent No. 2,584,271, February 5, 1952. Preferred reagents are isoamyl nitrite and potassium tertiary-butoxide. The reaction is usually conducted at relatively low temperature (10–40° C.) and after the reaction is completed, the excess of reagents is destroyed by the addition of an aliphatic ketone, such as acetone or butanone. The mixture is then diluted with water and the 3-allyloxy-16-oximino-17-keto steroid is precipitated. The latter is removed by filtration or similar operation and, if desired, purified by recrystallization.

The steroid 3-allyl ethers which are starting materials for the compounds which comprise this invention can be produced by the methods disclosed in the Huffman Patent No. 3,002,009, September 26, 1961, that is, by reacting a 3-hydroxy steroid having an aromatic ring A with allyl bromide in the presence of anhydrous potassium carbonate in an alcohol solvent.

The invention is disclosed in further detail by means of the following examples which are provided merely for the purpose of illustrating the invention. It will be appreciated by those skilled in the art that numerous modifications in equivalent materials and operating conditions can be made without departing from the invention as disclosed herein.

Example 1

16-oximinoequilenin allyl ether was produced from 775 mg. of equilenin allyl ether. The latter was dissolved in 31 ml. of a solution of potassium tertiary-butoxide in tertiary-butyl alcohol, and to the resulting solution was added 0.48 ml. of isoamyl nitrite. The mixture was stirred at room temperature for one hour, then treated with 0.35 ml. of 2-butanone and stirred for 15 minutes. The mixture was then diluted with 160 ml. of ice water and acidified with dilute sulfuric acid. Upon refrigeration a precipitate of 16-oximinoequilenin allyl ether formed. This was removed by filtration washed and dried. It has the formula

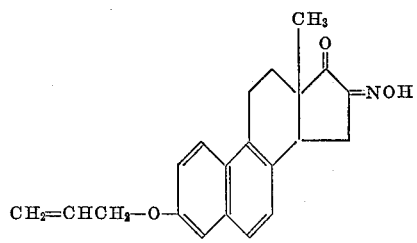

Example 2

16-oximinoestrone allyl ether was produced by the method of Example 1 from 500 mg. of estrone allyl ether, 0.32 ml. of isoamyl nitrite and an excess of potassium t-butoxide in t-butyl alcohol. After 0.25 ml. of acetone had been added and stirred in the mixture for 15 minutes, 115 ml. of ice water was added. The precipitate of 16-oximino-estrone allyl ether of the formula

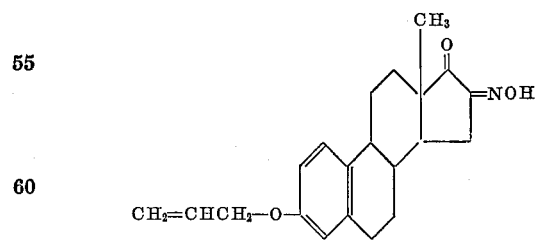

was removed, washed and dried. It was crystallized once from aqueous methanol and once from methylene chloride-hexane to give a melting point of 181–182° C.

Example 3

16-oximino-6-dehydrosterone allyl ether was produced by the method of Example 1 from 250 mg. of 6-dehydroestrone allyl ether, 0.15 ml. of isoamyl nitrite and an excess of potassium t-butoxide in t-butyl alcohol. After the nitrosation reaction was completed, 0.12 ml. of acetone was added, the reaction mixture stirred for 15 minutes, 60 ml. of ice water added, and the mixture refrigerated. A precipitate of 16-oximino-6-dehydroestrone allyl ether was formed, having the formula

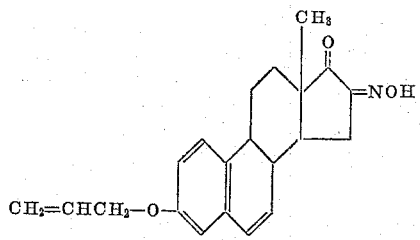

It was crystallized twice from methylene chloride-hexane to give a melting point of 184–185° C.

*Example 4*

16-oximinoequilin allyl ether of the formula

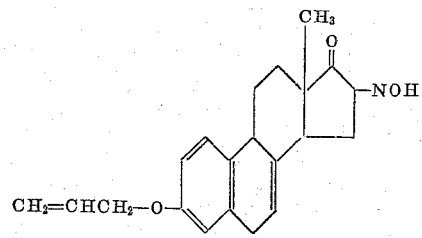

was produced by the method of Example 1 from 760 mg. of equilin and 0.45 ml. of isoamyl nitrite in an excess of a solution of potassium t-butoxide in t-butyl alcohol. The excess of reagent was destroyed with 0.3 ml. of 2-butanone and the reaction mixture diluted with 150 ml. of water. The precipitate of 16-oximinoequilin allyl ether was separated, washed and dried.

I claim:
1. An oximino steroid of the formula

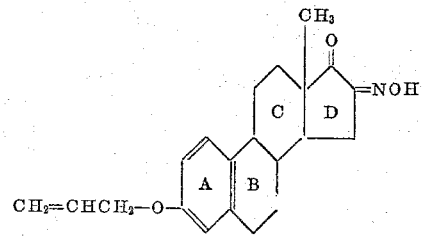

wherein ring B contains 1 to 3 double bonds.
2. 16-oximinoequilenin allyl ether.
3. 16-oximinoestrone allyl ether.
4. 16-oximino-6-dehydroestrone allyl ether.
5. 16-oximinoequilin allyl ether.

References Cited in the file of this patent
FOREIGN PATENTS
813,333    Great Britain _____ May 13, 1959
OTHER REFERENCES
Cava et al.: J.A.C.S. 84, January 1962, pages 115 and 116.